(12) United States Patent
Shah et al.

(10) Patent No.: US 8,417,800 B2
(45) Date of Patent: Apr. 9, 2013

(54) METHOD AND SYSTEM FOR NETWORK CONFIGURATION AND/OR PROVISIONING BASED ON OPEN VIRTUALIZATION FORMAT (OVF) METADATA

(75) Inventors: Hemal Shah, Trabuco Canyon, CA (US); Uri Elzur, Irvine, CA (US); Patricia Ann Thaler, Carmichael, CA (US)

(73) Assignee: Broadcom Corporation, Irvine, CA (US)

( * ) Notice: Subject to any disclaimer, the term of this patent is extended or adjusted under 35 U.S.C. 154(b) by 37 days.

(21) Appl. No.: 12/854,333

(22) Filed: Aug. 11, 2010

(65) Prior Publication Data

US 2012/0016970 A1    Jan. 19, 2012

Related U.S. Application Data

(60) Provisional application No. 61/365,137, filed on Jul. 16, 2010.

(51) Int. Cl.
*G06F 15/177* (2006.01)
(52) U.S. Cl. ........ 709/220; 709/221; 709/222; 709/223; 710/104; 718/1
(58) Field of Classification Search .................. None
See application file for complete search history.

(56) References Cited

U.S. PATENT DOCUMENTS 7,168,063 B2    1/2007  Meijer
2011/0107330 A1*  5/2011  Freundlich et al. ............... 718/1

OTHER PUBLICATIONS

Chapman et al. "Software architecture definition for on-demand cloud provisioning." Proceedings of the 19th ACM International Symposium on High Performance Distributed Computing. Jun. 2010. ACM Press. 61-72.*
Chandramouli, Ramaswamy et al. "State of Security Readiness." Crossroads, vol. 16 Issue 3. Mar. 2010. ACM PRess. pp. 23-25.*
Jin, X. et al. "Reinventing virtual appliances." IBM Journal of Research and Development. vol. 53, No. 4, Paper 7. pp. 7:1-7:15. 2009.*
The European Search report for the copending application 11005599. 3, mailed Oct. 31, 2011.
Mike Fratto: "Arista's Virtual Switch Takes Aim at Cisco's Nexus 1000V", Aug. 26, 2009, pp. 1-1, XP002661433, located at URL: http://www.networkcomputing.com/virtualization/229502928? printer_friendly=this-page.

(Continued)

*Primary Examiner* — Jeffrey R Swearingen
(74) *Attorney, Agent, or Firm* — Thomas | Horstemeyer, LLP (57) ABSTRACT

Certain aspects of a method and system for network configuration and/or provisioning based on open virtualization format (OVF) metadata may include accessing a set of port profiles for one or more virtual machines from a port profile database based on OVF metadata. One or more virtual machines may be configured, deployed, and/or managed based on the accessed set of port profiles. One or both of a uniform resource identifier (URI) to the profile data base and/or a port profile identification may be included in the OVF metadata to allow a virtual machine (VM) administrator device to access the set of port profiles for the one or more virtual machines from the port profile database. Alternatively, the set of port profiles may be included in the OVF metadata to allow the VM administrator device to access the set of port profiles for the one or more virtual machines from the port profile database.

19 Claims, 5 Drawing Sheets

OTHER PUBLICATIONS

Dmtf: "Open Virtualization Format Specification v 1.1.0", Jan. 12, 2010, XP55009707, located at URL: http://dmtf.org/sites/default/files/standards/documents/DSP0243_1.1.0.pdf.

Dmtf: "Ethernet Port Profile", Nov. 7, 2008, XP55009713, located at URL: http://dmtf.org/sites/defaut/files/standards/documents/DSP1014_1.0.0.pdf.

* cited by examiner

METHOD AND SYSTEM FOR NETWORK CONFIGURATION AND/OR PROVISIONING BASED ON OPEN VIRTUALIZATION FORMAT (OVF) METADATA

CROSS-REFERENCE TO RELATED APPLICATIONS/INCORPORATION BY REFERENCE

This application makes reference to, claims priority to, and claims benefit of U.S. Provisional Application Ser. No. 61/365,137, filed Jul. 16, 2010.

FIELD OF THE INVENTION

Certain embodiments of the invention relate to networking. More specifically, certain embodiments of the invention relate to a method and system for network configuration and/or provisioning based on open virtualization format (OVF) metadata.

BACKGROUND OF THE INVENTION

Information Technology (IT) management may require performing remote management operations of remote systems to perform inventory, monitoring, control, and/or to determine whether remote systems are up-to-date. For example, management devices and/or consoles may perform such operations as discovering and/or navigating management resources in a network, manipulating and/or administrating management resources, requesting and/or controlling subscribing and/or unsubscribing operations, and executing specific management methods and/or procedures. Management devices and/or consoles may communicate with devices in a network to ensure availability of remote systems, to monitor and/or control remote systems, to validate that systems may be up-to-date, and/or to perform any security patch updates that may be necessary.

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface with Ethernet networks.

The emergence of converged network interface controllers (CNICs) have provided accelerated client/server, clustering, and/or storage networking, and have enabled the use of unified TCP/IP Ethernet communications. The breadth and importance of server applications that may benefit from network interface controller (NIC) capabilities, together with the emergence of server operating systems interfaces enabling highly integrated network acceleration capabilities, may make NICs a standard feature of, for example, volume server configurations.

The deployment of NICs may provide improved application performance, scalability and server cost of ownership. The unified Ethernet network architecture enabled by NIC may be non-disruptive to existing networking and server infrastructure, and may provide significantly better performance at reduced cost alternatives. A server I/O bottleneck may significantly impact data center application performance and scalability. The network bandwidth and traffic loads for client/server, clustering and storage traffic have outpaced and may continue to consistently outpace CPU performance increases and may result in a growing mismatch of capabilities.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for network configuration and/or provisioning based on open virtualization format (OVF) metadata, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for network configuration and/or provisioning based on open virtualization format (OVF) metadata. Various aspects of the invention may enable accessing a set of port profiles for one or more virtual machines from a port profile database based on OVF metadata. One or more virtual machines may be configured, deployed, and/or managed based on the accessed set of port profiles. One or both of a uniform resource identifier (URI) to the profile data base and/or a port profile identification may be included in the OVF metadata to allow a virtual machine (VM) administrator device to access the set of port profiles for the one or more virtual machines from the port profile database. Alternatively, the set of port profiles may be included in the OVF metadata to allow the VM administrator device to access the set of port profiles for the one or more virtual machines from the port profile database.

The port profile database may comprise one or more of: unicast MAC addresses, multicast MAC addresses, promiscuous mode configuration, VLANs, for example, permitted VLANs, default VLAN, MAC address and/or VLAN combinations. The port profile database may also comprise one or more of: traffic priority information, for example, permitted priorities, default priority, and/or application to priority mapping. The port profile database may further comprise one or more of: flow control information, for example, XON/XOFF enabled/disabled, priority-based flow control settings, bandwidth settings, for example, minimum or maximum transmit and/or receive bandwidths, allocated bandwidth per traffic priority group, and/or access control lists (ACLs).

Figure 1:
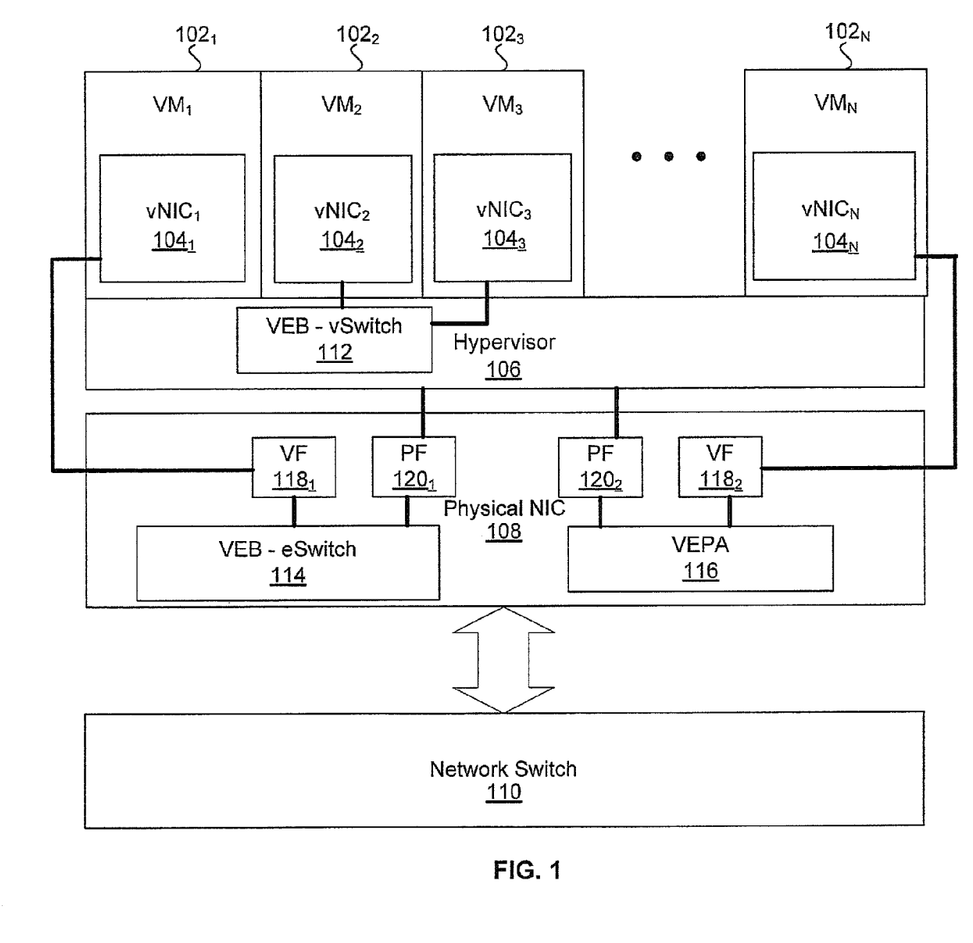
FIG. 1 is a block diagram of an exemplary virtualized platform, in accordance with an embodiment of the invention.

FIG. 1 is a block diagram of an exemplary virtualized platform, in accordance with an embodiment of the invention. Referring to FIG. 1, there is shown a plurality of virtual machines (VMs), $VM_1$ $102_1$, $VM_2$ $102_2$, $VM_3$ $102_3$ ... $VM_N$ $102_N$, a hypervisor 106, a physical network interface controller (NIC) 108, and a network switch 110. Each of the VMs may comprise one or more virtual NICs (vNICs). For example, $VM_1$ $102_1$ may comprise a $vNIC_1$ $104_1$, $VM_2$ $102_2$ may comprise a $vNIC_2$ $104_2$, $VM_3$ $102_3$ may comprise a $vNIC_3$ $104_3$, and $VM_N$ $102_N$ may comprise a $vNIC_N$ $104_N$. The hypervisor 106 may comprise a virtual Ethernet bridge (VEB) that may be implemented as a virtual switch (vSwitch) 112. The physical NIC 108 may comprise a VEB that may be implemented as a hardware switch (eSwitch) 114, a virtual Ethernet port aggregator (VEPA) 116, a plurality of virtual functions (VFs) $118_1$ and $118_2$, and a plurality of physical functions (PFs) $120_1$ and $120_2$.

The hypervisor 106 may be enabled to operate as a software layer that may enable the plurality of VMs, $VM_1$ $102_1$, $VM_2$ $102_2$, $VM_3$ $102_3$ ... $VM_N$ $102_N$ to share common hardware and implement OS virtualization of hardware resources and/or virtualization of hardware resources in the physical NIC 108, for example. The hypervisor 106 may also be operable to enable data communication between the VMs, $VM_1$ $102_1$, $VM_2$ $102_2$, $VM_3$ $102_3$ ... $VM_N$ $102_N$ and hardware resources in the physical NIC 108.

The physical NIC 108 may comprise suitable logic, circuitry, interfaces, and/or code that may enable communication of data with a network. The physical NIC 108 may enable level 2 (L2) switching operations, for example. A stateful network interface, for example, routers may be operable to maintain per flow state.

The network switch 110 may comprise suitable logic, circuitry, interfaces, and/or code that may enable posting of data for transmission via the physical NIC 108 and posting of data or work requests received via the physical NIC 108 for processing by a host system. In this regard, the physical NIC 108 may be operable to post data or work requests received from the network switch 110, and may retrieve data posted by the host for transmission to the network switch 110.

The plurality of VMs, $VM_1$ $102_1$, $VM_2$ $102_2$, $VM_3$ $102_3$ ... $VM_N$ $102_N$ may be operable to enable the running or execution of operations or services such as applications, email server operations, database server operations, and/or exchange server operations, for example. The plurality of vNICs, $vNIC_1$ $104_1$, $vNIC_2$ $104_2$, $vNIC_3$ $104_3$ ... $vNIC_N$ $104_N$ may correspond to or emulate software representations of the physical NIC 108 resources, for example. The virtualization of the physical NIC 108 resources via the plurality of vNICs, $vNIC_1$ $104_1$, $vNIC_2$ $104_2$, $vNIC_3$ $104_3$ ... $vNIC_N$ $104_N$ may enable the hypervisor 106 to provide L2 switching support provided by the physical NIC 108 to the plurality of VMs, $VM_1$ $102_1$, $VM_2$ $102_2$, $VM_3$ $102_3$ ... $VM_N$ $102_N$.

The VEB vSwitch 112 may be implemented in software within the hypervisor 106, for example. The VEB vSwitch 112 may be operable to support the physical NIC 108 and one or more vNICs, for example, $vNIC_2$ $104_2$ and $vNIC_3$ $104_3$.

The VEB eSwitch 114 may comprise suitable logic, circuitry, interfaces, and/or code that may enable direct I/O support for one or more vNICs, for example, $vNIC_1$ $104_1$ via one or more VFs, for example, $VF_1$ $118_1$. The VEB eSwitch 114 may be operable to allow a VM, for example, $VM_1$ $102_1$ to bypass the hypervisor 106 and directly access the physical NIC 108 to send and/or receive packets. The VEB eSwitch 114 may be operable to allow a VM, for example, $VM_1$ $102_1$ to access the physical NIC 108 via the hypervisor 106 based on one or more PFs, for example, $PF_1$ $120_1$. The VEB eSwitch 114 may be operable to forward packets based on a MAC address and/or a virtual local area network (VLAN) identifier.

The VEPA 116 may comprise suitable logic, circuitry, interfaces, and/or code that may enable collaboration with an adjacent bridge to provide frame relay services between the plurality of VMs, $VM_1$ $102_1$, $VM_2$ $102_2$, $VM_3$ $102_3$ ... $VM_N$ $102_N$ and an external network. The VEPA 116 may be operable to forward one or more station-originated frames to an adjacent bridge for frame processing and frame relay. The VEPA 116 may be operable to steer one or more frames and replicate multicast and broadcast frames received from the adjacent bridge to the appropriate VM destinations.

In operation, when a VM needs to send a packet to the network, transmission of the packet may be controlled at least in part by the hypervisor 106. The hypervisor 106 may be operable to arbitrate access to the physical NIC 108 resources when more than one VM needs to send a packet to the network. In this regard, the hypervisor 106 may utilize one or more vNICs to indicate to the corresponding VM regarding the current availability of the physical NIC 108 transmission resources as a result of the arbitration. The hypervisor 106 may be operable to coordinate the transmission of packets from the plurality of VMs, $VM_1$ $102_1$, $VM_2$ $102_2$, $VM_3$ $102_3$ ... $VM_N$ $102_N$ by posting the packets in a PCIe bus, for example, in accordance with the results of the arbitration operation.

When receiving packets from the network switch 110 via the physical NIC 108, the hypervisor 106 may be operable to determine the media access control (MAC) address associated with the packet in order to transfer the received packet to the appropriate VM. In this regard, the hypervisor 106 may receive the packets from the PCIe bus, for example, and may demultiplex the packets for transfer to the appropriate VM. After a determination of the MAC address and appropriate VM for a received packet, the hypervisor 106 may transfer the received packet from a buffer in the hypervisor 106 controlled portion of the host memory to a buffer in the portion of the host memory that corresponds to each of the appropriate VMs, $VM_1$ $102_1$, $VM_2$ $102_2$, $VM_3$ $102_3$ ... $VM_N$ $102_N$.

Figure 2:
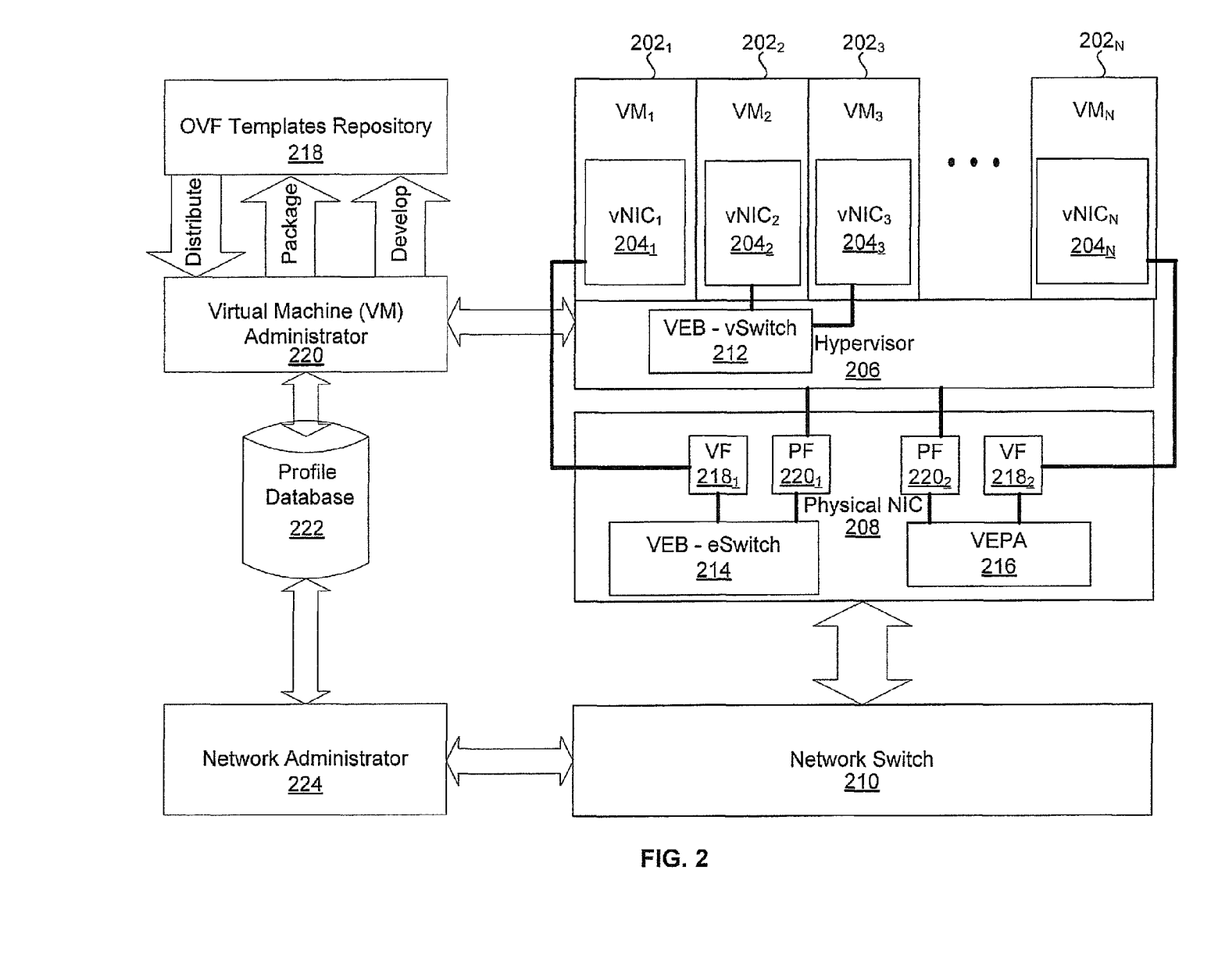
FIG. 2 is a block diagram illustrating exemplary network configuration and/or provisioning based on open virtualization format (OVF) metadata, in accordance with an embodiment of the invention.

FIG. 2 is a block diagram illustrating exemplary network configuration and/or provisioning based on open virtualization format (OVF) metadata, in accordance with an embodiment of the invention. Referring to FIG. 2, there is shown a plurality of VMs, $VM_1$ $202_1$, $VM_2$ $202_2$, $VM_3$ $202_3$ ... $VM_N$ $202_N$, a hypervisor 206, a physical NIC 208, a network switch 210, a OVF templates repository 218, a VM administrator device 220, a port profile database 222, and a network administrator device 224. Each of the VMs may comprise one or more vNICs. For example, $VM_1$ $202_1$ may comprise a $vNIC_1$ $204_1$, $VM_2$ $202_2$ may comprise a $vNIC_2$ $204_2$, $VM_3$ $202_3$ may comprise a $vNIC_3$ $204_3$, and $VM_N$ $202_N$ may comprise a $vNIC_N$ $204_N$. The hypervisor 206 may comprise a VEB that may be implemented as a vSwitch 212. The physical NIC 208 may comprise a VEB that may be implemented as an eSwitch 214, a VEPA 216, a plurality of VFs $218_1$ and $218_2$, and a plurality of PFs $220_1$ and $220_2$. The plurality of blocks in FIG.

2 may be substantially similar to the plurality of corresponding blocks as described with respect to FIG. 1, for example.

The OVF templates repository 218 may comprise one or more OVF templates for packaging and distribution of software that may be operable to run in one or more of the plurality of VMs, $VM_1$ $202_1$, $VM_2$ $202_2$, $VM_3$ $202_3$ ... $VM_N$ $202_N$.

The port profile database 222 may comprise suitable logic, interfaces, and/or code that may comprise configuration and/or provisioning information relating to network, quality of service (QoS) and/or storage properties of the plurality of VMs, $VM_1$ $202_1$, $VM_2$ $202_2$, $VM_3$ $202_3$ ... $VM_N$ $202_N$. For example, the port profile database 222 may comprise port profiles for the plurality of VMs based on attributes such as bandwidth allocation, MAC address, VLAN IDs, traffic priorities, flow control information, and/or access control lists (ACLs), for example.

The VM administrator device 220 may comprise suitable logic, interfaces, processors, circuitry, and/or code that may be operable to access a set of port profiles for one or more virtual machines (VMs), for example, $VM_1$ $202_1$, $VM_2$ $202_2$, $VM_3$ $202_3$ ... $VM_N$ $202_N$ from the port profile database 222 based on OVF metadata. One or more processors and/or circuits in the VM administrator device 220 may be operable to configure, deploy, manage, and/or monitor the one or more VMs, for example, $VM_1$ $202_1$, $VM_2$ $202_2$, $VM_3$ $202_3$ ... $VM_N$ $202_N$ based on the accessed set of port profiles from the port profile database 222.

The network administrator device 224 may comprise suitable logic, interfaces, processors, circuitry, and/or code that may be operable to access a set of port profiles from the port profile database 222. The network administrator device 224 may be operable to configure, manage, and/or monitor one or more switches, for example, network switch 210 based on the accessed set of port profiles.

In operation, a VM administrator device 220 may be operable to package an OVF template in the OVF templates repository 218 by including a port profile identifier and/or a uniform resource identifier (URI) to the port profile database 222 in the OVF metadata. The port profile identifier and/or the URI may reside in the global namespace for port profiles in the port profile database 222. The port profile identifier and/or the URI may be described inside a VirtualSystem element utilizing PortProfileSection, for example.

```
<VirtualSystem ovf:id="simple-app">
  <Info>A virtual machine</Info>
  <Name>Simple Appliance</Name>
  <PortProfileSection>
    <evb:PortProfile>
      xs:AnyURI or xs:string
    </evb:PortProfile>
  </PortProfileSection>
</VirtualSystem>
```

The VM administrator device 220 may be operable to access a set of port profiles from the port profile database 222 based on the URI and/or the port identifier, and read the port profile corresponding to a particular VM, for example, $VM_1$ $202_1$. The VM administrator device 220 may be operable to apply port profile specific configuration to the particular VM, for example, $VM_1$ $202_1$ at the time of deployment. Accordingly, an OVF template need not comprise port profile specific metadata and may allow changing port profile configuration parameters in the port profile database 222 without requiring changes to the OVF templates that reference the port profile database 222.

In accordance with an embodiment of the invention, one or more VM administrator devices 220 for different domains may coordinate deployment of VMs, and each domain may translate a port profile URI to domain specific database schema, for example. The URI access may be redirected to an appropriate database schema based on the domain, for example. The port profiles in the port profile database 222 may be represented by an identification number, a URI, and/or a database location in the OVF metadata.

In accordance with another embodiment of the invention, the set of port profiles may be included in the OVF metadata, for example, as extensions or attributes. The VM administrator device 220 may be operable to apply port profile specific configuration to the particular VM, for example, $VM_1$ $202_1$ at the time of deployment based on the set of port profiles included in the OVF metadata, for example.

```
<VirtualSystem ovf:id="simple-app">
  <Info>A virtual machine</Info>
  <Name>Simple Appliance</Name>
  <PortProfileSection>
    <evb:PortProfile>
      <evb: DCBConfiguration>
        <evb:PFCEnabled> ... </evb:PFCEnabled>
        <evb:Priority> ... </evb:Priority>
        <evb:MinBandwidth> ... </evb:MinBandwidth>
        <evb:MaxBandwidth> ... </evb:MaxBandwidth>
        ...
      </evb:DCBConfgiuration>
      <evb:AccessControlList>
        ...
      </evb:AccessControlList>
    </evb: PortProfile>
  </PortProfileSection>
</VirtualSystem>
```

Figure 3:
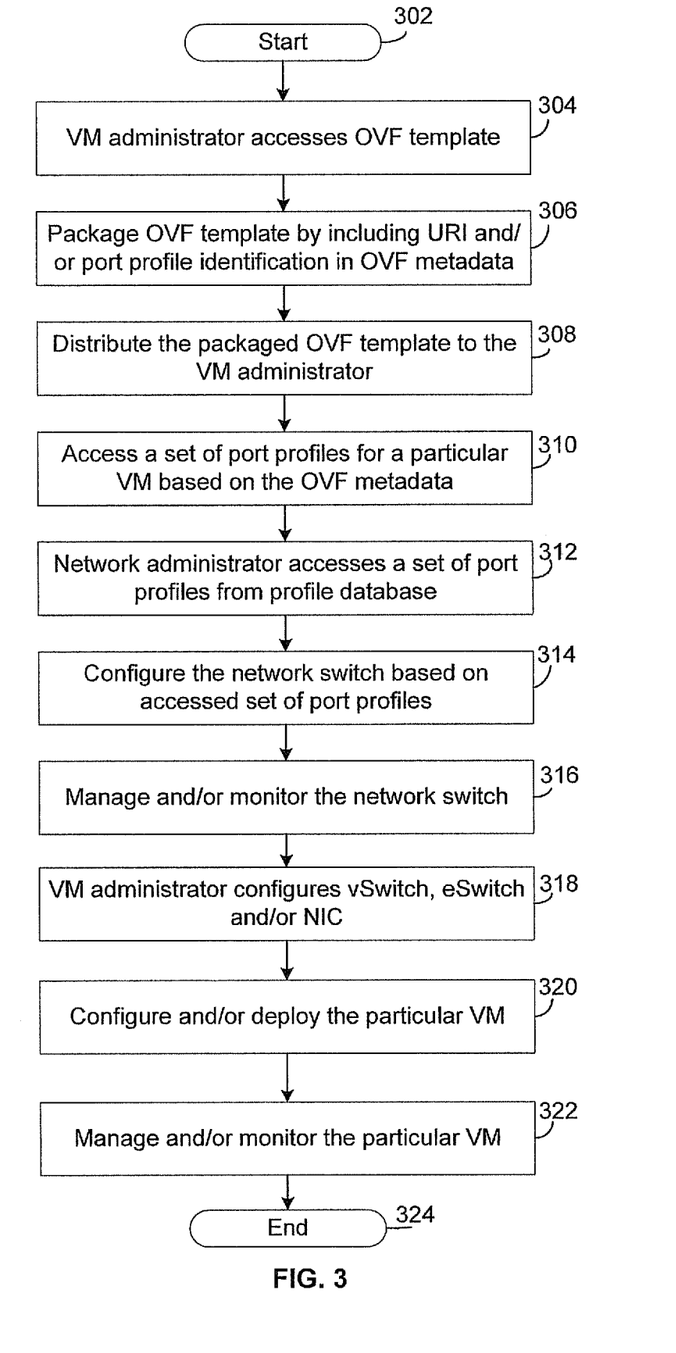
FIG. 3 is a flowchart illustrating exemplary steps for network configuration and/or provisioning based on a uniform resource identifier (URI) in OVF metadata, in accordance with an embodiment of the invention.

FIG. 3 is a flowchart illustrating exemplary steps for network configuration and/or provisioning based on a uniform resource identifier (URI) in OVF metadata, in accordance with an embodiment of the invention. Referring to FIG. 3, exemplary steps may begin at step 302. In step 304, the VM administrator device 220 may access an OVF template from the OVF templates repository 218. In step 306, the VM administrator device 220 may package the OVF template by including in the OVF metadata, one or both of a uniform URI to the port profile database 222 and/or a port profile identification. In step 308, the OVF templates repository 218 may distribute the packaged OVF template to the VM administrator device 220.

In step 310, the VM administrator device 220 may access a set of port profiles for a particular VM, for example, $VM_N$ $202_N$ from the port profile database 222 based on the URI and/or port profile identification in the OVF metadata. In step 312, the network administrator device 224 may access a set of port profiles from the port profile database 222. In step 314, the network administrator device 224 may configure the network switch 210 based on the accessed set of port profiles. In step 316, the network administrator device 224 may manage and/or monitor the network switch 210.

In step 318, the VM administrator device 220 may configure vSwitch 212, eSwitch 214 and/or the physical NIC 208 based on the OVF metadata. In step 320, the VM administrator device 220 may configure and/or deploy the particular VM, for example, $VM_N$ $202_N$ based on the accessed set of port profiles from the port profile database 222. In step 322, the VM administrator device 220 may manage and/or monitor the particular VM, for example, $VM_N$ 202$_N$. Control then proceeds to end step 324.

Figure 4:
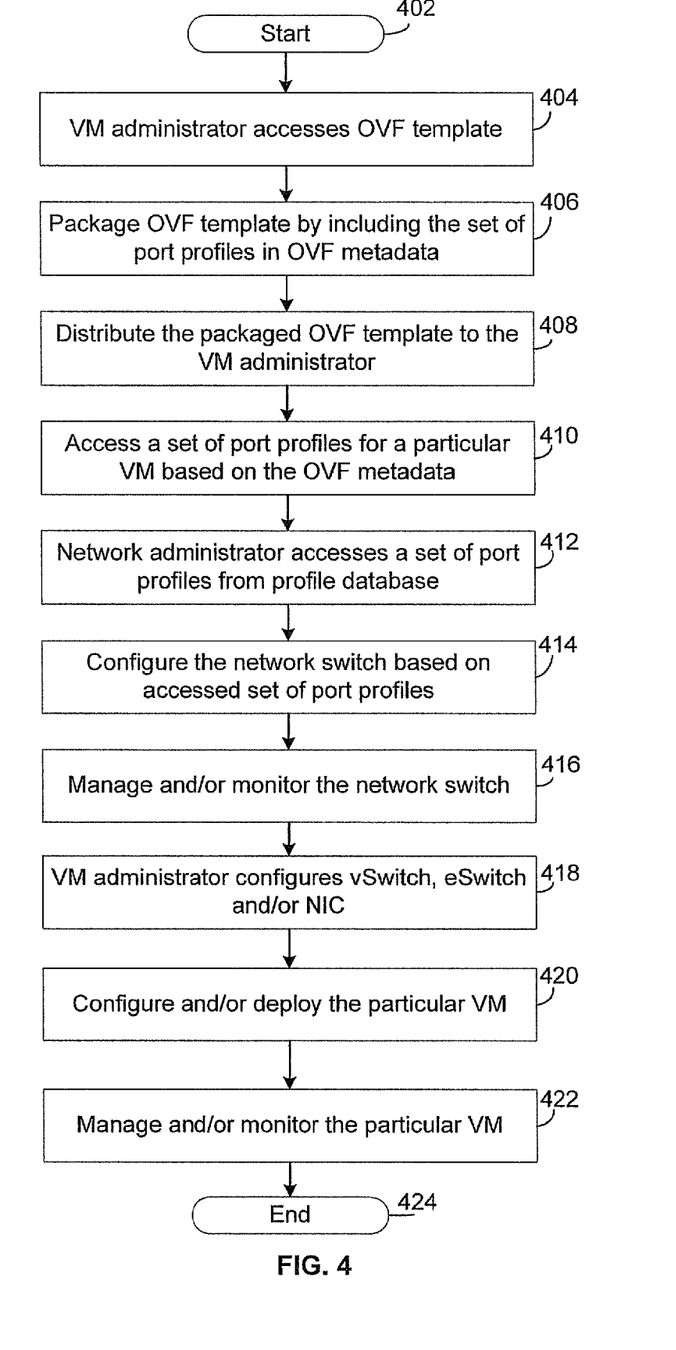
FIG. 4 is a flowchart illustrating exemplary steps for network configuration based on including port profile configuration in OVF metadata, in accordance with an embodiment of the invention.

FIG. 4 is a flowchart illustrating exemplary steps for network configuration based on including port profile configuration in OVF metadata, in accordance with an embodiment of the invention. Referring to FIG. 4, exemplary steps may begin at step 402. In step 404, the VM administrator device 220 may access an OVF template from the OVF templates repository 218. In step 406, the VM administrator device 220 may access a set of port profiles for a particular VM, for example, $VM_N$ 202$_N$ from the port profile database 222 based on the OVF metadata. In step 408, the VM administrator device 220 may package the OVF template by including the set of port profiles in the OVF metadata.

In step 410, the OVF templates repository 218 may distribute the packaged OVF template to the VM administrator device 220. In step 412, the network administrator device 224 may access a set of port profiles from the port profile database 222. In step 414, the network administrator device 224 may configure the network switch 210 based on the accessed set of port profiles. In step 416, the network administrator device 224 may manage and/or monitor the network switch 210.

In step 418, the VM administrator device 220 may configure vSwitch 212, eSwitch 214 and/or the physical NIC 208 based on the OVF metadata. In step 420, the VM administrator device 220 may configure and/or deploy the particular VM, for example, $VM_N$ 202$_N$ based on the accessed set of port profiles from the port profile database 222. In step 422, the VM administrator device 220 may manage and/or monitor the particular VM, for example, $VM_N$ 202$_N$. Control then proceeds to end step 424.

Figure 5:
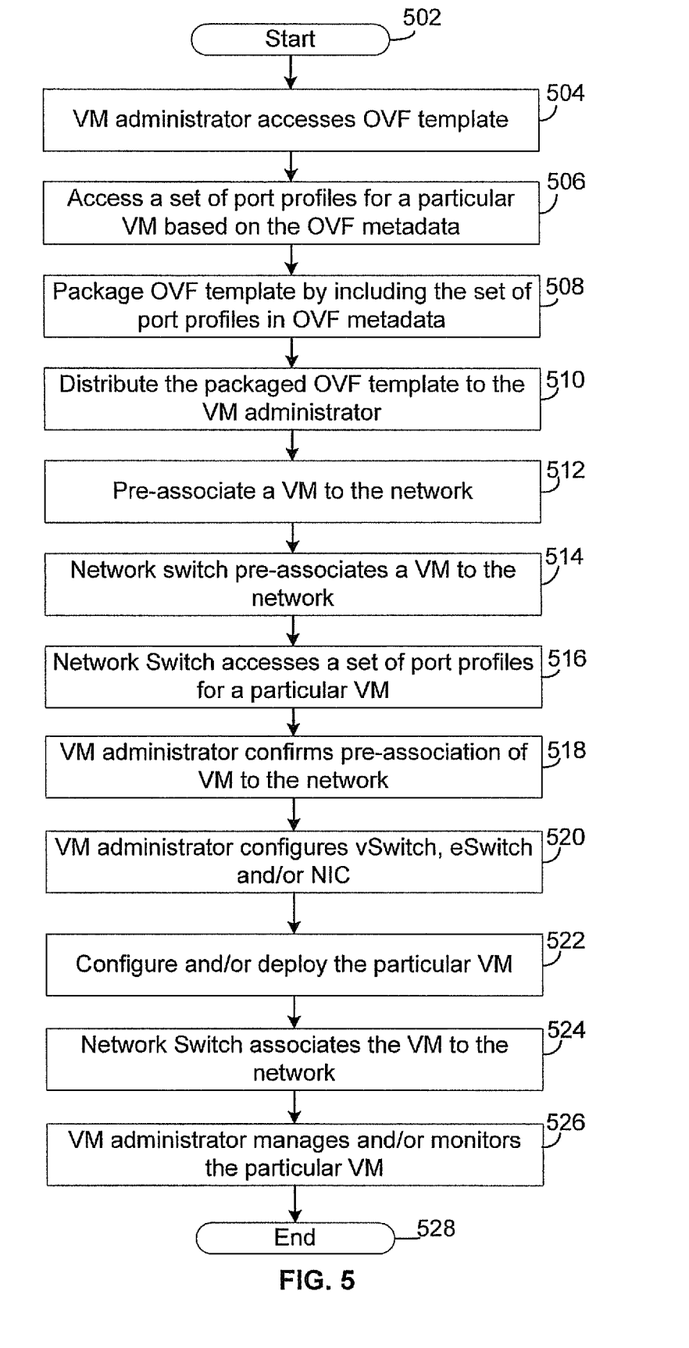
FIG. 5 is a flowchart illustrating exemplary steps for network configuration and/or provisioning based on including port profile configuration in OVF metadata when the network is not pre-provisioned with the set of port profiles, in accordance with an embodiment of the invention.

FIG. 5 is a flowchart illustrating exemplary steps for network configuration and/or provisioning based on including port profile configuration in OVF metadata when the network is not pre-provisioned with the set of port profiles, in accordance with an embodiment of the invention. Referring to FIG. 5, exemplary steps may begin at step 502. In step 504, the VM administrator device 220 may access an OVF template from the OVF templates repository 218. In step 506, the VM administrator device 220 may access a set of port profiles for a particular VM, for example, $VM_N$ 202$_N$ from the port profile database 222 based on the OVF metadata. In step 508, the VM administrator device 220 may package the OVF template by including the set of port profiles in the OVF metadata.

In step 510, the OVF templates repository 218 may distribute the packaged OVF template to the VM administrator device 220. In step 512, the VM administrator device 220 may pre-associate a VM, for example, $VM_N$ 202$_N$ to a network, for example, Ethernet, based on the OVF metadata, if the network is not pre-provisioned with the set of port profiles. In step 514, the network switch 210 may pre-associate a VM, for example, $VM_N$ 202$_N$ to the network. In step 516, the network switch may access a set of port profiles for the VM, for example, $VM_N$ 202$_N$ from the port profile database 222. In step 518, the VM administrator device 220 may confirm the pre-association of the VM, for example, $VM_N$ 202$_N$ to the network, for example, Ethernet.

In step 520, the VM administrator device 220 may configure vSwitch 212, eSwitch 214 and/or the physical NIC 208 based on the OVF metadata. In step 522, the VM administrator device 220 may configure and/or deploy the particular VM, for example, $VM_N$ 202$_N$ based on the accessed set of port profiles from the port profile database 222. In step 524, the network switch 210 may associate the VM, for example, $VM_N$ 202$_N$ to the network. In step 526, the VM administrator device 220 may manage and/or monitor the particular VM, for example, $VM_N$ 202$_N$. Control then proceeds to end step 528.

In accordance with an embodiment of the invention, a method and system for network configuration and/or provisioning based on OVF metadata may comprise one or more processors and/or circuits for use in a virtual machine (VM) administrator device 220, which may be operable to access a set of port profiles for one or more virtual machines (VMs), for example, $VM_1$ 202$_1$, $VM_2$ 202$_2$, $VM_3$ 202$_3$ ... $VM_N$ 202$_N$ (FIG. 2) from a port profile database 222 (FIG. 2) based on open virtualization format (OVF) metadata. One or more processors and/or circuits in the VM administrator device 220 may be operable to configure, deploy, manage, and/or monitor the one or more VMs, for example, $VM_1$ 202$_1$, $VM_2$ 202$_2$, $VM_3$ 202$_3$ ... $VM_N$ 202$_N$ based on the accessed set of port profiles from the port profile database 222. One or more processors and/or circuits in the VM administrator device 220 may be operable to package one or more OVF templates in the OVF template repository 218 (FIG. 2) by including in the OVF metadata, one or both of a uniform resource identifier (URI) to the port profile database 222 and/or the port profile identification. One or more processors and/or circuits in the VM administrator device 220 may be operable to access the set of port profiles for the one or more VMs, for example, $VM_1$ 202$_1$, $VM_2$ 202$_2$, $VM_3$ 202$_3$ ... $VM_N$ 202$_N$ from the port profile database 222 based on including in the OVF metadata, one or both of the URI to the port profile database 222 and/or the port profile identification.

One or more processors and/or circuits in the VM administrator device 220 may be operable to access the set of port profiles for the one or more VMs, for example, $VM_1$ 202$_1$, $VM_2$ 202$_2$, $VM_3$ 202$_3$ ... $VM_N$ 202$_N$ from the port profile database 222 based on including the set of port profiles in the OVF metadata. One or more processors and/or circuits in the VM administrator device 220 may be operable to package one or more OVF templates in the OVF template repository 218 by including the accessed set of port profiles in the OVF metadata. One or more processors and/or circuits in the VM administrator device 220 may be operable to configure one or more of virtual switches, for example, vSwitch 212 (FIG. 2), physical switches, for example, eSwitch 214 (FIG. 2), and/or network interface controllers (NICs), for example, physical NIC 208 (FIG. 2) based on the OVF metadata. One or more processors and/or circuits in the VM administrator device 220 may be operable to pre-associate the one or more VMs, for example, $VM_1$ 202$_1$, $VM_2$ 202$_2$, $VM_3$ 202$_3$ ... $VM_N$ 202$_N$ to a network, for example, Ethernet, based on the OVF metadata, if the network is not pre-provisioned with the set of port profiles. One or more processors and/or circuits in the VM administrator device 220 may be operable to confirm the pre-association of the one or more VMs, for example, $VM_1$ 202$_1$, $VM_2$ 202$_2$, $VM_3$ 202$_3$ ... $VM_N$ 202$_N$ to the network, for example, Ethernet. The set of port profiles may comprise one or more of networking attributes, storage attributes, quality of service attributes, medium access control (MAC) identification, virtual local area network (VLAN) identification, bandwidth allocation, traffic priorities, flow control information, and/or access control lists (ACLs), for example.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for network configuration and/or provisioning based on open virtualization format (OVF) metadata.

Accordingly, the present invention may be realized in hardware or a combination of hardware and software. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   in an administrator device for a virtual machine:
      accessing an open virtualization format (OVF) template from an OFV templates repository;
      accessing a set of port profiles for the virtual machine from a port profile database based on OVF metadata in the OVF template, the OVF metadata referencing the set of port profiles in the port profile database, the port profile database being separate from the OVF template; and
      configuring said virtual machine based on said accessed set of port profiles.

2. The method according to claim 1, comprising packaging the OVF template by including in said OVF metadata a uniform resource identifier (URI) referring to said port profile database, a port profile identification referring to the port profile database, or any combination thereof.

3. The method according to claim 2, comprising accessing said set of port profiles for said virtual machine from said port profile database based on said packaging.

4. The method according to claim 1, comprising packaging the OVF template by including said accessed set of port profiles in said OVF metadata.

5. The method according to claim 1, comprising configuring a virtual switch, a physical switch, a network interface controller (NIC), or any combination thereof based on said OVF metadata.

6. The method according to claim 1, wherein said virtual machine is pre-associated to a network based on said OVF metadata, if said network is not pre-provisioned with said set of port profiles.

7. The method according to claim 6, comprising confirming said pre-association of said virtual machine to said network.

8. The method according to claim 1, wherein said set of port profiles comprises a networking attribute, a storage attribute, a quality of service attribute, a medium access control (MAC) identification, a virtual local area network (VLAN) identification, a bandwidth allocation, a traffic priority, a flow control attribute, an access control list (ACL), or any combination thereof.

9. The method according to claim 1, comprising managing said virtual machine based on said OVF metadata.

10. A system for networking, the system comprising:
    one or more processors, one or more circuits, or any combination thereof for use in an administrator device for a virtual machine, said one or more processors, one or more circuits, or any combination thereof being operable to:
       access an open virtualization (OVF) template from an OVF templates repository;
       access a set or port profiles for a virtual machine from a port profile database based on OVF metadata in the OVF template, the OVF metadata referencing the set of port profiles in the profile database, the port profile database being separate from the OVF template; and
       configure said virtual machine based on said accessed said set of port profiles.

11. The system according to claim 10, wherein said one or more processors, one or more circuits, or any combination thereof are operable to package the OVF template by including in said OVF metadata a uniform resource identifier (URI) referring to said port profile database, a port profile identification referring to said port profile database, or any combination thereof.

12. The system according to claim 11, wherein said one or more processors, one or more circuits, or any combination thereof are operable to access said set of port profiles for said virtual machine from said port profile database based on said packaging.

13. The system according to claim 10, wherein said one or more processors, one or more circuits, or any combination thereof are operable to package the OVF template by including said accessed set of port profiles in said OVF metadata.

14. The system according to claim 10, wherein said one or more processors, one or more circuits, or any combination thereof are operable to configure a virtual switch, a physical switch, a network interface controller (NIC), or any combination thereof based on said OVF metadata.

15. The system according to claim 10, wherein said virtual machine is pre-associated to a network based on said OVF metadata, if said network is not pre-provisioned with said set of port profiles.

16. The system according to claim 15, wherein said one or more processors, one or more circuits, or any combination thereof are operable to confirm said pre-association of said virtual machine to said network.

17. The system according to claim 10, wherein said set of port profiles comprises a networking attribute, a storage attribute, a quality of service attribute, a medium access control (MAC) identification, a virtual local area network (VLAN) identification, a bandwidth allocation, a traffic priority, a flow control attribute, an access control list (ACL), or any combination thereof.

18. The system according to claim 10, wherein said one or more processors, one or more circuits, or any combination thereof are operable to manage said virtual machine based on said OVF metadata.

19. A non-transitory computer-readable medium embodying a program executable in an administrator device for a virtual machine, the program designed to:
- access an open virtualization format (OVF) template for the virtual machine from an OFV templates repository in a first device;
- access a set of port profiles for the virtual machine from a port profile database in a second device, the port profile database based on OVF metadata in the OVF template, the set of port profiles in the port profile database being referenced by OVF metadata in the template for the virtual machine, the port profile database being separate from the OVF template; and
- configure said virtual machine based on the set of port profiles.

* * * * *